United States Patent
Lee et al.

(10) Patent No.: US 8,386,719 B2
(45) Date of Patent: Feb. 26, 2013

(54) METHOD AND APPARATUS FOR CONTROLLING SHARED MEMORY AND METHOD OF ACCESSING SHARED MEMORY

(75) Inventors: Byung Bog Lee, Daejeon (KR); Myung Nam Bae, Daejeon (KR); Byeong Cheol Choi, Daejeon (KR); In Hwan Lee, Daejeon (KR); Nae Soo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 12/539,351

(22) Filed: Aug. 11, 2009

(65) Prior Publication Data

US 2010/0042788 A1 Feb. 18, 2010

(30) Foreign Application Priority Data

Aug. 12, 2008 (KR) .................. 10-2008-0078911

(51) Int. Cl.
*G06F 12/00* (2006.01)
*G06F 13/16* (2006.01)
(52) U.S. Cl. .......... 711/150; 710/52; 710/305; 711/152; 711/E12.001; 719/312
(58) Field of Classification Search .................. None
See application file for complete search history.

(56) References Cited

U.S. PATENT DOCUMENTS

| | | | | |
|---|---|---|---|---|
| 4,056,711 A * | 11/1977 | Lamar | ................. | 712/E9.007 |
| 4,847,757 A * | 7/1989 | Smith | ................. | 710/114 |
| 5,659,713 A * | 8/1997 | Goodwin et al. | ................. | 711/157 |
| 5,713,006 A * | 1/1998 | Shigeeda | ................. | 711/170 |
| 5,900,014 A * | 5/1999 | Bennett | ................. | 711/138 |
| 5,941,964 A * | 8/1999 | Young et al. | ................. | 710/100 |
| 5,960,458 A * | 9/1999 | Kametani | ................. | 711/147 |
| 6,091,714 A * | 7/2000 | Sensel et al. | ................. | 370/260 |
| 6,161,168 A * | 12/2000 | Kametani | ................. | 711/147 |
| 6,502,173 B1 * | 12/2002 | Aleksic et al. | ................. | 711/168 |
| 6,526,467 B1 * | 2/2003 | Joh | ................. | 710/305 |
| 6,604,185 B1 * | 8/2003 | Fromm | ................. | 711/207 |
| 6,986,005 B2 * | 1/2006 | Vo | ................. | 711/152 |
| 7,062,587 B2 * | 6/2006 | Zaidi et al. | ................. | 710/305 |
| 7,409,506 B2 * | 8/2008 | Kamigata et al. | ................. | 711/151 |
| 7,610,061 B2 * | 10/2009 | Suh et al. | ................. | 710/310 |
| 7,882,279 B2 * | 2/2011 | Takehara | ................. | 710/110 |
| 8,203,361 B2 * | 6/2012 | Uchida et al. | ................. | 326/86 |
| 2003/0126381 A1 * | 7/2003 | Vo | ................. | 711/152 |
| 2006/0143416 A1 * | 6/2006 | Kamigata et al. | ................. | 711/163 |

* cited by examiner

*Primary Examiner* — Jasmine Song
*Assistant Examiner* — Daniel Bernard
(74) *Attorney, Agent, or Firm* — Staas & Halsey LLP

(57) ABSTRACT

Provided are a method and apparatus for controlling a shared memory, and a method of accessing the shared memory. The apparatus includes a processing unit configured to process an application program, a user program unit configured to execute a program written by a user based on the application program of the processing unit, a shared memory unit connected to each of the processing unit and the user program unit through a system bus and configured to store data interchanged between the processing unit and the user program unit, and a control unit configured to relay a control signal indicating whether the system bus, by which the data is interchanged between the processing unit and the user program unit, is occupied, and control connection of each of the processing unit and the user program unit with the system bus in response to the control signal. In the apparatus, the processing unit and the user program unit can easily interchange a large amount of messages through the shared memory unit having an abundant memory space.

9 Claims, 8 Drawing Sheets

METHOD AND APPARATUS FOR CONTROLLING SHARED MEMORY AND METHOD OF ACCESSING SHARED MEMORY

CROSS-REFERENCE TO RELATED PATENT APPLICATION

This application claims the benefit of Korean Patent Application No. 10-2008-0078911, filed on Aug. 12, 2008, in the Korean Intellectual Property Office, the disclosure of which is incorporated herein in its entirety by reference.

BACKGROUND OF THE INVENTION

1. Field of the Invention

The present invention relates to a method and an apparatus for controlling shared memory and a method of accessing the shared memory, and more particularly, to a method and an apparatus for sharing a memory to store data interchanged between a processing unit for processing an application program and a user program unit for executing a user program based on the application program of the processing unit.

2. Description of the Related Art

A general-purpose processor (GPP) reference board is a board designed to allow system developers to refer to the GPP.

In order to realize desired systems, the system developers may design a field-programmable gate array (FPGA) daughter board, mount the FPGA daughter board on the GPP reference board, and embody related software. Also, in order to embody and verify developed communication protocols and application specific integrated circuits (ASICs), there is a growing tendency for the system developers to realize FPGA device drivers in accordance with FPGA logic designs and GPP operating systems.

Accordingly, a communication protocol may be required to reciprocally transmit and receive control signals and data between the GPP and an FPGA. In a conventional method of interchanging messages, a GPP and an FPGA may transmit and receive messages through a random access memory (RAM) included in the FPGA. In another method, a GPP and a dual-port RAM (DPRAM) may be connected to each other by a system bus, and the DPRAM and an FPGA may be connected to each other by a local bus. Thus, the DPRAM may be designated as a critical section so that messages may be interchanged between the GPP and the FPGA while ensuring data integrity. Here, the critical section refers to a section of source code that accesses shared resources in an exclusive fashion.

Meanwhile, since a GPP reference board is designed to allow the expansion of a system bus, an FPGA, a complex programmable logic device (CPLD), a buffer configured to relay bidirectional transmission and reception of data, and a DPRAM may be mounted on a daughter board or other devices so that the GPP and the FPGA may interchange a large amount of messages through the DPRAM having an abundant memory space.

SUMMARY OF THE INVENTION

The present invention provides a method and an apparatus for controlling a shared memory capable of storing data interchanged between a processing unit for processing an application program and a user program unit for executing a user program based on the application program of the processing unit, and a method of accessing the shared memory in each of the processing unit and the user program unit.

According to an aspect of the present invention, there is provided a shared memory control apparatus including: a processing unit configured to process an application program; a user program unit configured to execute a program written by a user based on the application program of the processing unit; a shared memory unit connected to each of the processing unit and the user program unit through a system bus and configured to store data interchanged between the processing unit and the user program unit; and a control unit configured to relay a control signal indicating whether the system bus, by which data is interchanged between the processing unit and the user program unit, is occupied and control connection of each of the processing unit and the user program unit with the system bus in response to the control signal.

According to another aspect of the present invention, there is provided a method of controlling a shared memory by a control unit configured to relay a control signal interchanged between a processing unit configured to process an application program and a user program unit configured to execute a program written by a user based on the application program. The method includes: receiving a signal indicating whether the processing unit needs to occupy a system bus connected to the shared memory; writing a value corresponding to the received signal in a register of the user program unit; transmitting a request of the user program unit for occupancy or non-occupancy of the system bus to the processing unit; transmitting a grant of the processing unit about the request for the occupancy or non-occupancy of the system bus to the user program unit, wherein the request is required for accessing the memory; and allowing the processing unit or the user program unit to occupy the system bus based on the grant.

According to another aspect of the present invention, there is provided a method of accessing a shared memory by a processing unit configured to process an application program. The method includes: writing a value indicating whether the processing unit needs to occupy a system bus connected to the shared memory in a register of a user program unit configured to execute a program written by a user based on the application program; receiving a request for occupancy or non-occupancy of the system bus from the user program unit; granting the received request depending on whether the processing unit needs to occupy the system bus; and accessing the shared memory through the system bus when the processing unit needs to occupy the system bus.

According to another aspect of the present invention, there is provided a method of accessing a shared memory by a user program unit configured to execute a program written by a user based on an application program processed by a processing unit. The method includes: reading a value indicating whether or not the processing unit needs to occupy a system bus connected to the shared memory from a register of the user program unit; transmitting a request for occupancy or non-occupancy of the system bus determined based on the read value; receiving a grant from the processing signal about the transmitted request; and accessing the shared memory through the system bus based on the received grant.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

The preceding merely illustrates the principles of the invention. It will thus be appreciated that those of ordinary skill in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in drawings may be provided through the use of dedicated hardware as well as hardware capable of executing software in association with appropriate software, such as, for example, a "processor." When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

The objects, features, and advantages of the present invention will be apparent from the following detailed description of embodiments of the invention with references to the following drawings. Descriptions of well-known components and processing techniques are omitted so as not to unnecessarily obscure the embodiments of the present invention. The present invention will now be described more fully with reference to the accompanying drawings, in which exemplary embodiments of the invention are shown.

Figure 1:
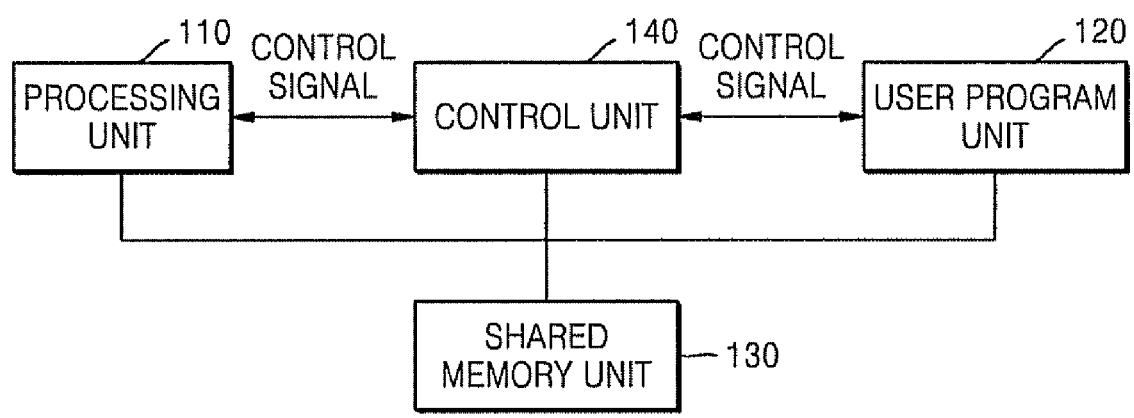
FIG. 1 is a block diagram of a shared memory control apparatus according to an embodiment of the present invention.

FIG. 1 is a block diagram of a shared memory control apparatus according to an embodiment of the present invention.

Referring to FIG. 1, the shared memory control apparatus according to the present embodiment may include a processing unit 110, a user program unit 120, a shared memory unit 130, and a control unit 140.

The processing unit 110 may process an application program. The processing unit 110 may be embodied by a reference board including a general-purpose processor (GPP). The GPP may include an application program module capable of processing an application program, or an interrupt service routine.

The user program unit 120 may execute a program written by a user based on the application program of the processing unit 110. The user program unit 120 may be embodied by a field-programmable gate array (FPGA).

When the processing unit 110 is embodied by the reference board including the GPP, the user program unit 120 embodied by the FPGA, along with the shared memory unit 130 and the control unit 140, may constitute a daughter board or other devices or peripheral devices including the FPGA.

The shared memory unit 130 may be connected to each of the processing unit 110 and the user program unit 120 using a system bus, and store data interchanged between the processing unit 110 and the user program unit 120. The shared memory unit 130 may be a dual-port random access memory (DPRAM) having an abundant space to store messages between the processing unit 110 and the user program unit 120.

The control unit 140 may relay a control signal indicating whether the system bus, by which data is interchanged between the processing unit 110 and the user program unit 120, is occupied and control the connection of the processing unit 110 and the user program unit 120 with the system bus in response to the control signal. For example, the control unit 140 may be embodied by a programmable logic device (PLD).

For instance, when the control signal is a signal indicating that the processing unit 110 grants occupancy of the system bus to the user program unit 120, a connection between the processing unit 110 and the system bus may be interrupted. By comparison, when the control signal is a signal that allows the processing unit 110 to store data to be transmitted to the user program unit 120 in the shared memory unit 130, the connection between the processing unit 110 and the system bus may be enabled to permit the processing unit 110 to access the shared memory unit 130.

The control unit 140 may control connections of the processing unit 110 and the user program unit 120 with the system bus by providing a buffer capable of allowing or interrupting a connection between the system bus and the processing unit 110 and a connection between the system bus and the user program unit 120. Thus, the control unit 140 may instruct the buffer to allow or interrupt each of the connections.

In this case, the system bus may be divided into a first system bus and a second system bus on the basis of the buffer. The first system bus may connect the processing unit 110 and the buffer, and the second system bus may connect the buffer, the shared memory unit 130, and the user program unit 120.

In another method of controlling the connection of the system bus with each of the processing unit 110 and the user program unit 120, the control unit 140 may transmit an instruction to prohibit each of the processing unit 110 and the user program unit 120 from occupying the system bus.

Also, the shared memory unit 130 may include an exclusive memory region connected to the user program unit 120 by the system bus and an additional local bus so that the user program unit 120 can arbitrarily access the exclusive memory region without the control of the control unit 140.

Figure 2:
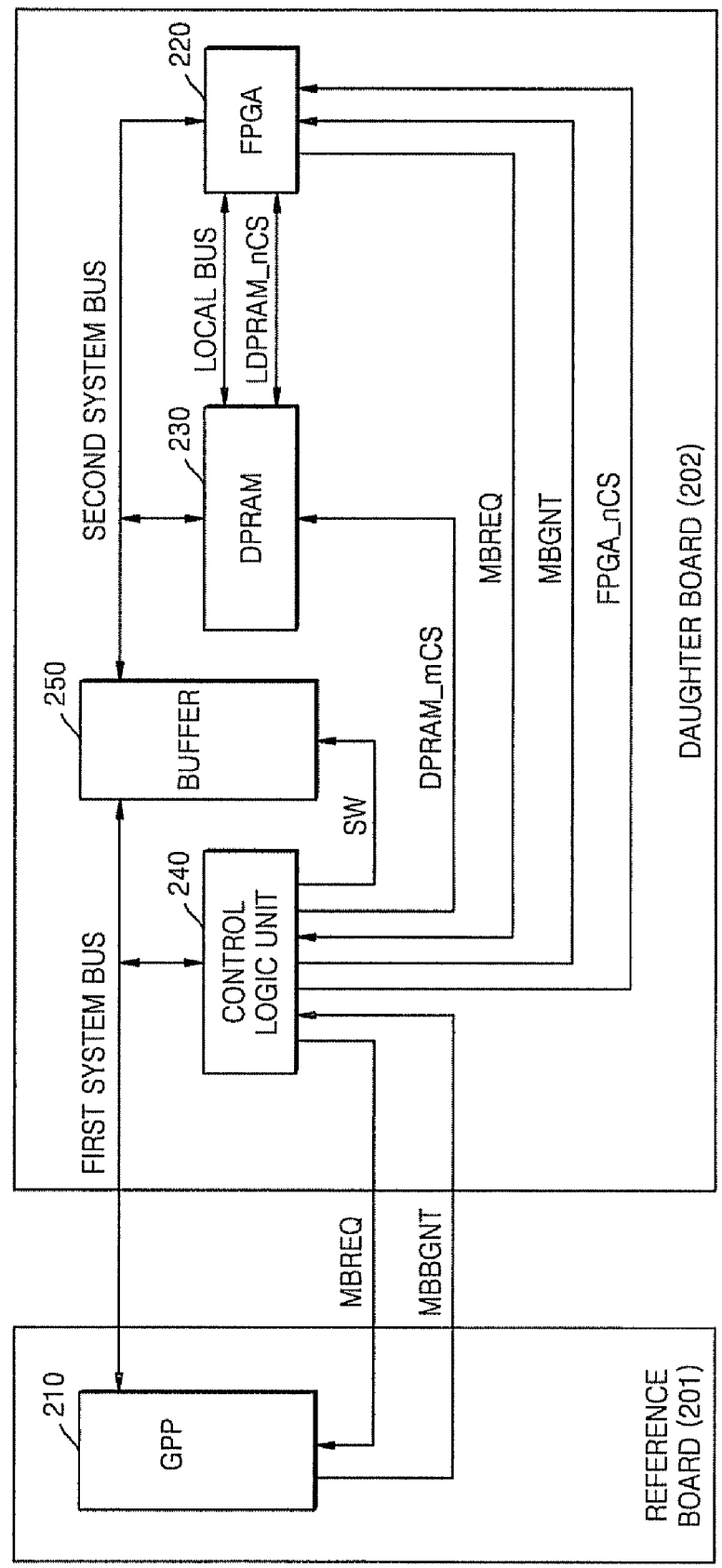
FIG. 2 is a construction diagram of a shared memory control apparatus according to an embodiment of the present invention.

FIG. 2 is a construction diagram of a shared memory control apparatus according to an embodiment of the present invention.

In the shared memory control apparatus, a reference board 201 having a GPP 210 is connected to a daughter board 202 having an FPGA 220.

The reference board 201 may include the GPP 210, and the daughter board 202 connected to the reference board 201 may include the FPGA 220, a DPRAM 230, a control logic unit 240, and a buffer 250.

The GPP 210 may control a memory bus request (MBREQ) signal and a memory bus grant (MBGNT) signal, which may be received and transmitted respectively through a general-purpose input/output (GPIO) port of the GPP 210. A GPIO management unit may manage the input and output of the MBREQ and MBGNT signals through the GPIO port. That is, the GPP 210 may include a plurality of GPIO ports, and the GPIO management unit may manage the plurality of GPIO ports and an application program or interrupt service routine input and output through each of the GPIO ports.

That is, in the present embodiment, an interchange of MBREQ and MBGNT signals between the GPP 210 and the control logic unit 240, an interchange of a switch (SW) signal between the control logic unit 240 and the buffer 250, an interchange of a DPRAM_nCS signal between the control logic unit 240 and the DPRAM 230, and an interchange of MBREQ, MBGNT, and FPGA_nCS signals between the control logic unit 240 and the FPGA 220 may be enabled through the system bus and additional hardware pins.

In the present embodiment, the system bus that connects the GPP 210, the FPGA 220, the DPRAM 230, the control logic unit 240, and the buffer 250 may be divided into a first system bus and a second system bus on the basis of the buffer 250. The first system bus may connect the GPP 210, the control logic unit 240, and the buffer 250, and the second system bus may connect the buffer 250, the DPRAM 230, and FGPA 220.

Also, the control logic unit 240 of the present embodiment may be embodied by a complex PLD (CPLD).

In order to control a connection between the GPP 210 and the first system bus, the control logic unit 240 may translate an address transferred on the first system bus connected to the GPP 210, instruct the buffer 250 to switch between the first and second system buses based on the translated address. That is, the control logic unit 240 may relay MBREQ and MBGNT signals and generate an SW signal instructing the buffer 240 to bus switch in response to the MBREQ and MBGNT signals.

In other words, the control logic unit 240 may relay the MBREQ and MBGNT signals output by the daughter board 202 including the FPGA 220 or other peripheral devices including the FPGA 220 depending on whether the GPP 210 needs to occupy a memory or not.

Also, the control logic unit 240 may chip-select the DPRAM 230 or the FPGA 220 based on the translated address. That is, the control logic unit 240 may generate the DPRAM_nCS signal or the FPGA_nCS signal. For example, the control logic unit 240 may receive the MBREQ signal or a system bus non-occupancy request signal (not shown) from the FPGA 220 and instruct the buffer 240 to interrupt or allow a connection between the first and second system buses.

The buffer 250 may function as a bi-directional buffer switch that enables or disables the connection between the first and second system buses in response to the instruction given by the control logic unit 240.

Meanwhile, the GPP 210 may write and update its information in a flag memory enable register (MER) when the GPP 210 needs to occupy the system bus. The FPGA 220 may refer to the information written in the flag MER and request for occupancy or non-occupancy of the system bus.

The DPRAM 230 may be a memory shared between the GPP 210 and the FPGA 220 and used as a buffer for interchanging a large amount of messages between the GPP 110 and the FPGA 220. The DPRAM 230 may be replaced by a flash memory or any other type of memory.

Also, although not shown, a plurality of peripheral devices, which replace the single daughter board 202, may be connected to the reference board 201. In this case, MBREQ signals output by the plurality of peripheral devices including FPGAs may be controlled according to an order of priority. The order of priority may be determined in advance or changed according to a user's selection or the characteristics of a program executed by the GPP 210.

When the FPGA 220 sets an arbitrary region of the DPRAM 230 as an exclusive memory region thereof and separately manages the exclusive memory region of the FPGA 220, the FPGA 220 may access data of the exclusive memory region at any time through the additional local bus independent of the system bus. In this case, the DPRAM 230 may be embodied by a dual-port memory having a first port (or shared port) connected to the second system bus and a second port (or local port) connected to the local bus of the FPGA 220. In this case, only one of the GPP 210 and the FPGA 220 that is granted access to the shared port according to MBREQ/MBGNT procedures may be allowed to access the shared port. That is, the GPP 210 and the FPGA 220 cannot simultaneously access the shared port. By comparison, the local port is always accessible by the FPGA 220. In the present embodiment, the DPRAM 230 may be divided into a critical section, which is a shared region accessed by the GPP 210 and the FPGA 220, and an address region accessed only by the FPGA 220. In this case, the GPP 210 and the FPGA 220 may be allowed to access the critical section only through the shared port, while the FPGA 220 may be allowed to access the address region only through the local port.

Figure 3:
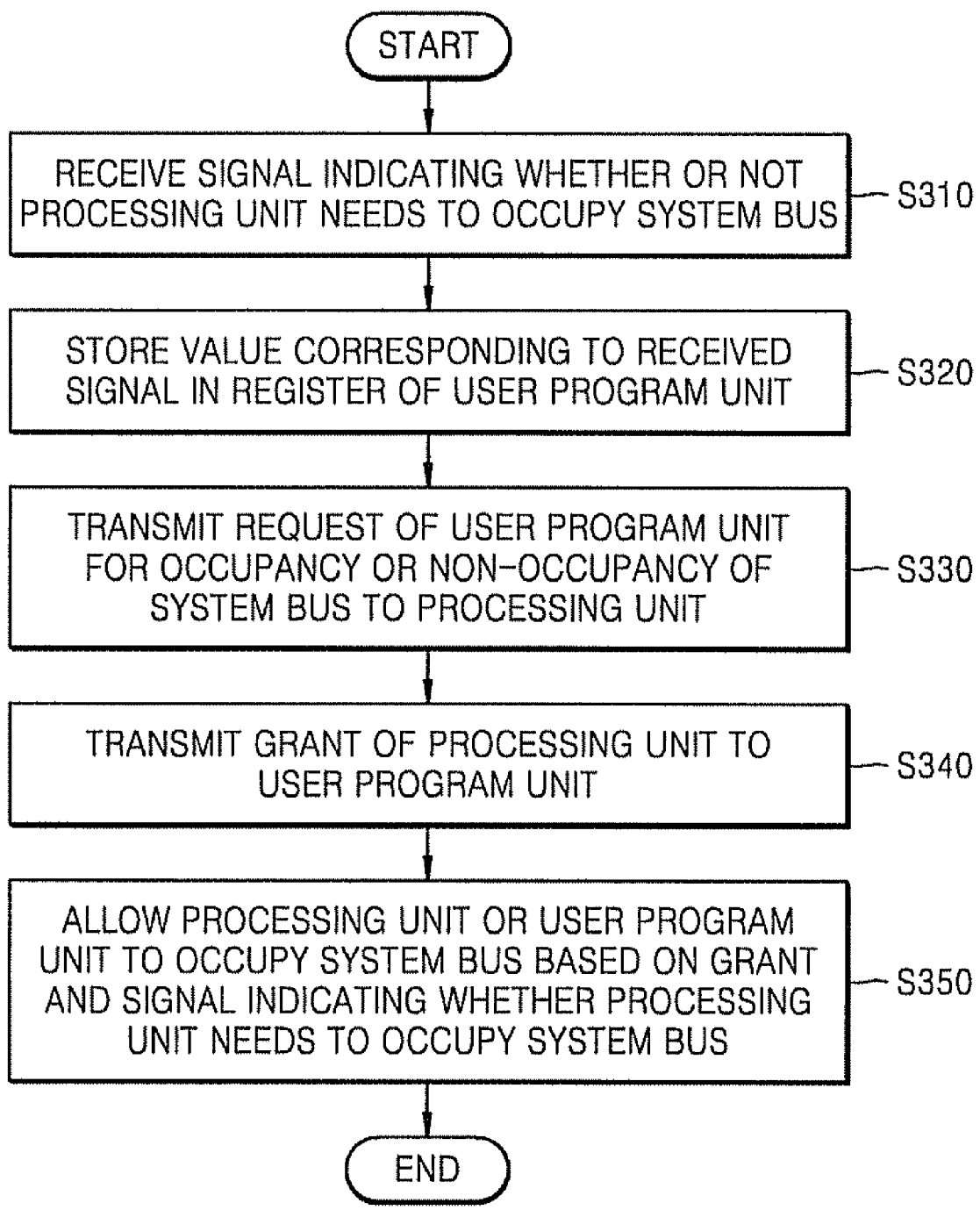
FIG. 3 is a flowchart illustrating a method of controlling a shared memory between a processing unit and a user program unit by a control unit of a shared memory control apparatus, according to an embodiment of the present invention.

FIG. 3 is a flowchart illustrating a method of controlling a shared memory between a processing unit and a user program unit by a control unit of a shared memory control apparatus, according to an embodiment of the present invention.

To begin with, the control unit may receive a signal indicating whether the processing unit needs to occupy a system bus connected to a memory in operation S310. In the present embodiment, the signal indicating whether the processing unit needs to occupy the system bus may include a signal indicating that the processing unit intends to be a master of the system bus and exclusively access the shared memory, and a signal indicating that the processing unit intends to give the right to access the system bus to a device other than the processing unit.

In operation S320, the control unit may write a value corresponding to the signal indicating whether the processing unit needs to occupy the system bus connected to the memory in a register of the user program unit.

In operation S330, the control unit may transmit a request of the user program unit for occupancy or non-occupancy of the system bus to the processing unit. In the present embodiment, the request for the occupancy or non-occupancy of the system bus may include a request for occupancy of the system bus and a request for non-occupancy of the system bus.

In operation S340, the control unit may transmit a grant of the processing unit about the request of the user program unit for the occupancy or non-occupancy of the system bus to the user program unit.

If the processing unit needs to occupy the system bus connected to the memory, the processing unit may grant the request of the user program unit for the non-occupancy of the system bus. Otherwise, if the processing unit does not need to occupy the system bus connected to the memory, the processing unit may grant the request of the user program unit for the occupancy of the system bus.

Based on the grant and the signal indicating whether the processing unit needs to occupy the system bus connected to the memory, one of the processing unit and the user program unit may be allowed to access the memory in operation S350. If the processing unit grants the request of the user program unit for the non-occupancy of the system bus, the processing unit may be allowed to occupy the system bus. Otherwise, if the processing unit grants the request of the user program unit for the occupancy of the system bus, the user program unit may be allowed to occupy the system bus.

Figure 4:
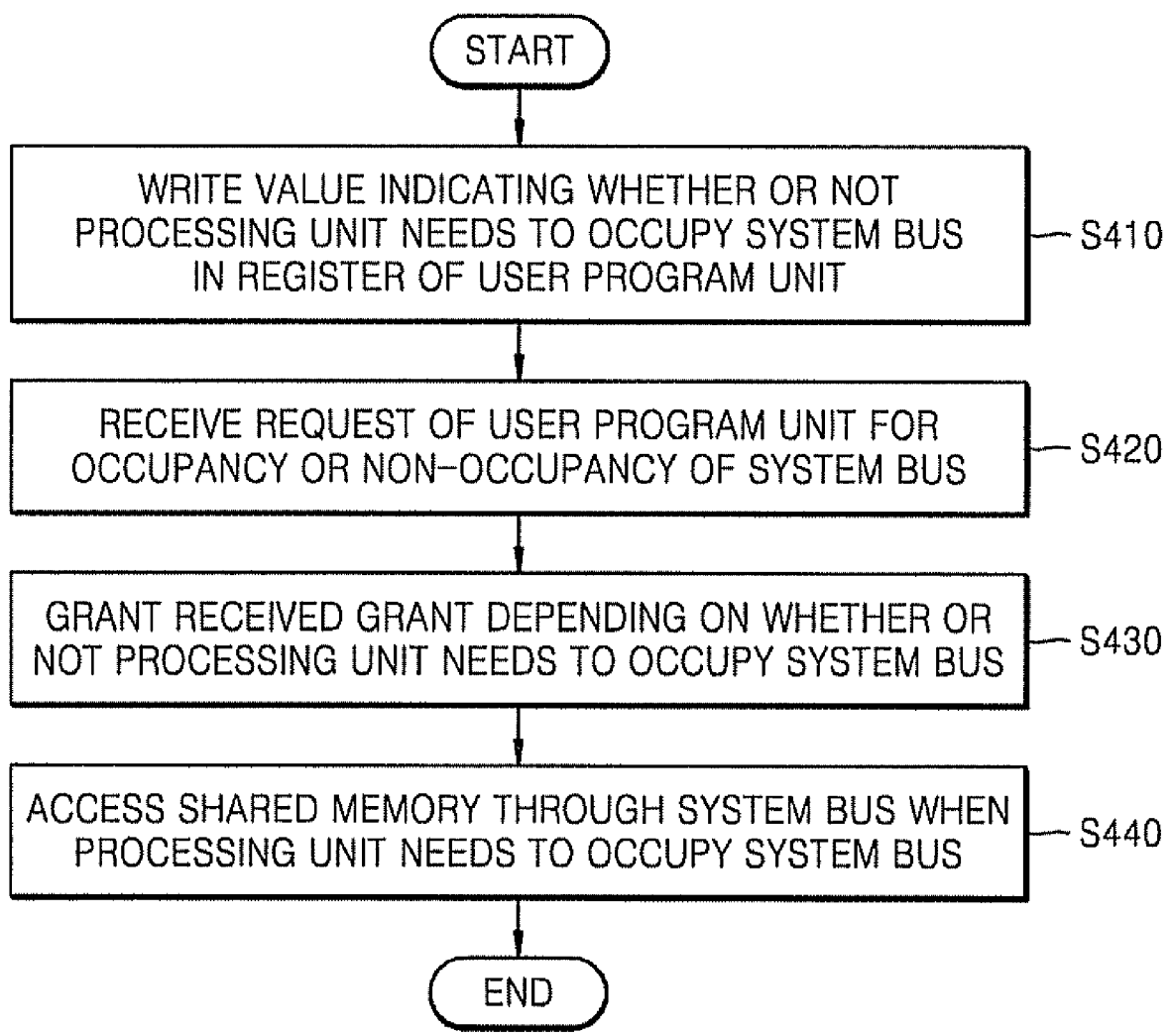
FIG. 4 is a flowchart illustrating a method of accessing a shared memory by a processing unit of a shared memory control apparatus, according to an embodiment of the present invention.

FIG. 4 is a flowchart illustrating a method of accessing a shared memory by a processing unit of a shared memory control apparatus, according to an embodiment of the present invention.

In operation 410, a processing unit may write a value corresponding to a signal indicating whether the processing unit needs to occupy a system bus connected to the shared memory in a register of a user program unit.

In operation S420, the processing unit may receive a request of the user program unit for occupancy or non-occupancy of the system bus. The request for the occupancy and non-occupancy of the system bus may include a request for occupancy of the system bus and a request for non-occupancy of the system bus.

In operation S430, the processing unit may grant the user program unit request depending on whether the processing unit needs to occupy the system bus. If the processing unit needs to occupy the system bus connected to the memory, the processing unit may grant the request of the user program unit for the non-occupancy of the system bus. Otherwise, if the processing unit does not need to occupy the system bus connected to the memory, the processing unit may grant the request of the user program unit for the occupancy of the system bus.

In operation S440, if the processing unit needs to occupy the system bus, the processing unit may access the shared memory through the system bus.

Figure 5:
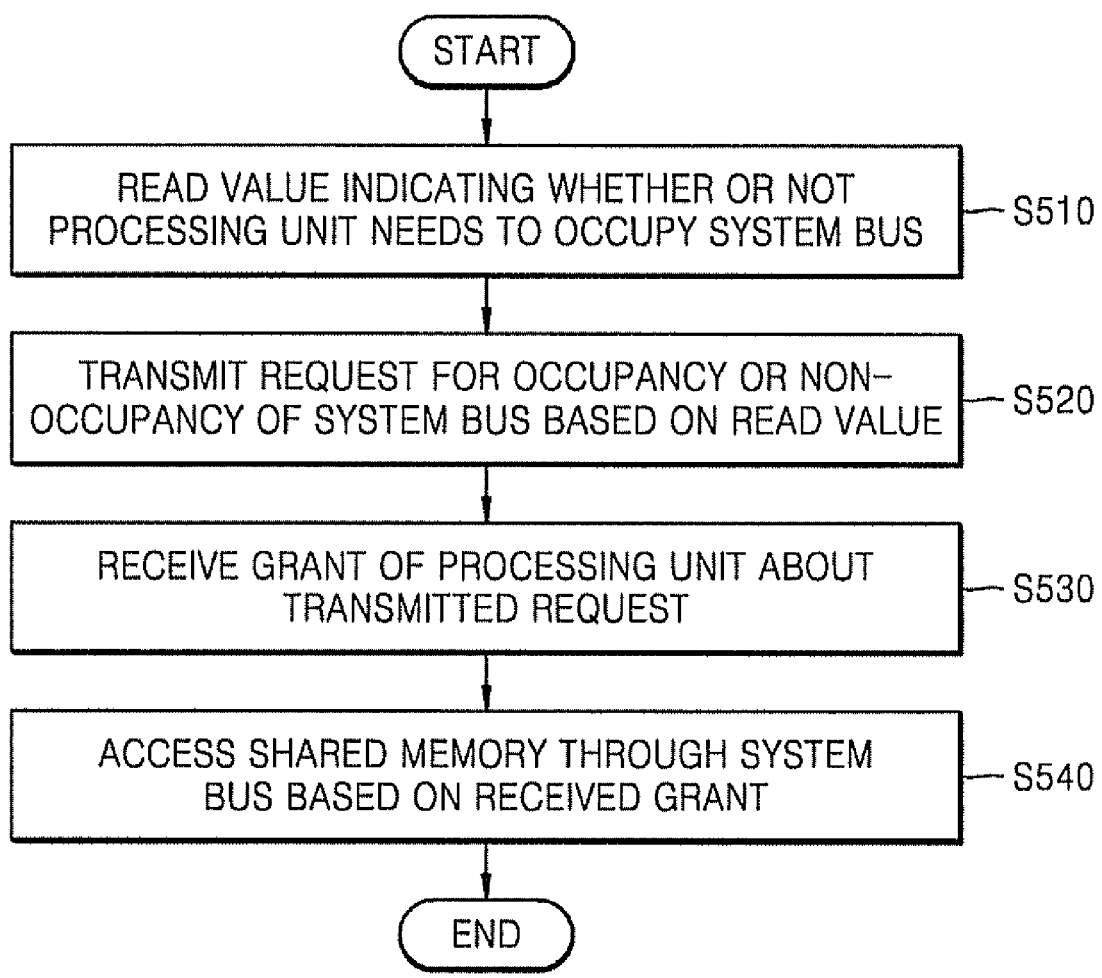
FIG. 5 is a flowchart illustrating a method of accessing a shared memory by a user program unit of a shared memory control apparatus, according to an embodiment of the present invention.

FIG. 5 is a flowchart illustrating a method of accessing a shared memory by a user program unit of a shared memory control apparatus, according to an embodiment of the present invention.

In operation S510, the user program unit may read a value corresponding to a signal indicating whether a processing unit needs to occupy a system bus connected to a shared memory from a register embedded therein.

In operation S520, the user program unit may determine occupancy or non-occupancy of the system bus based on the read value, and transmit a request for the occupancy or non-occupancy of the system bus. The request for the occupancy or non-occupancy of the system bus may include a request for occupancy of the system bus and a request for non-occupancy of the system bus.

In operation S530, the user program unit may receive a grant of the processing unit about the request of the user program unit for the occupancy or non-occupancy of the system bus.

In operation S540, the user program unit may access the shared memory through the system bus based on the grant of the processing unit.

In addition, when the shared memory includes an exclusive memory region connected to the user program unit by a local memory, the user program unit can arbitrarily access the exclusive memory region independent of the grant of the processing unit.

Figure 6:
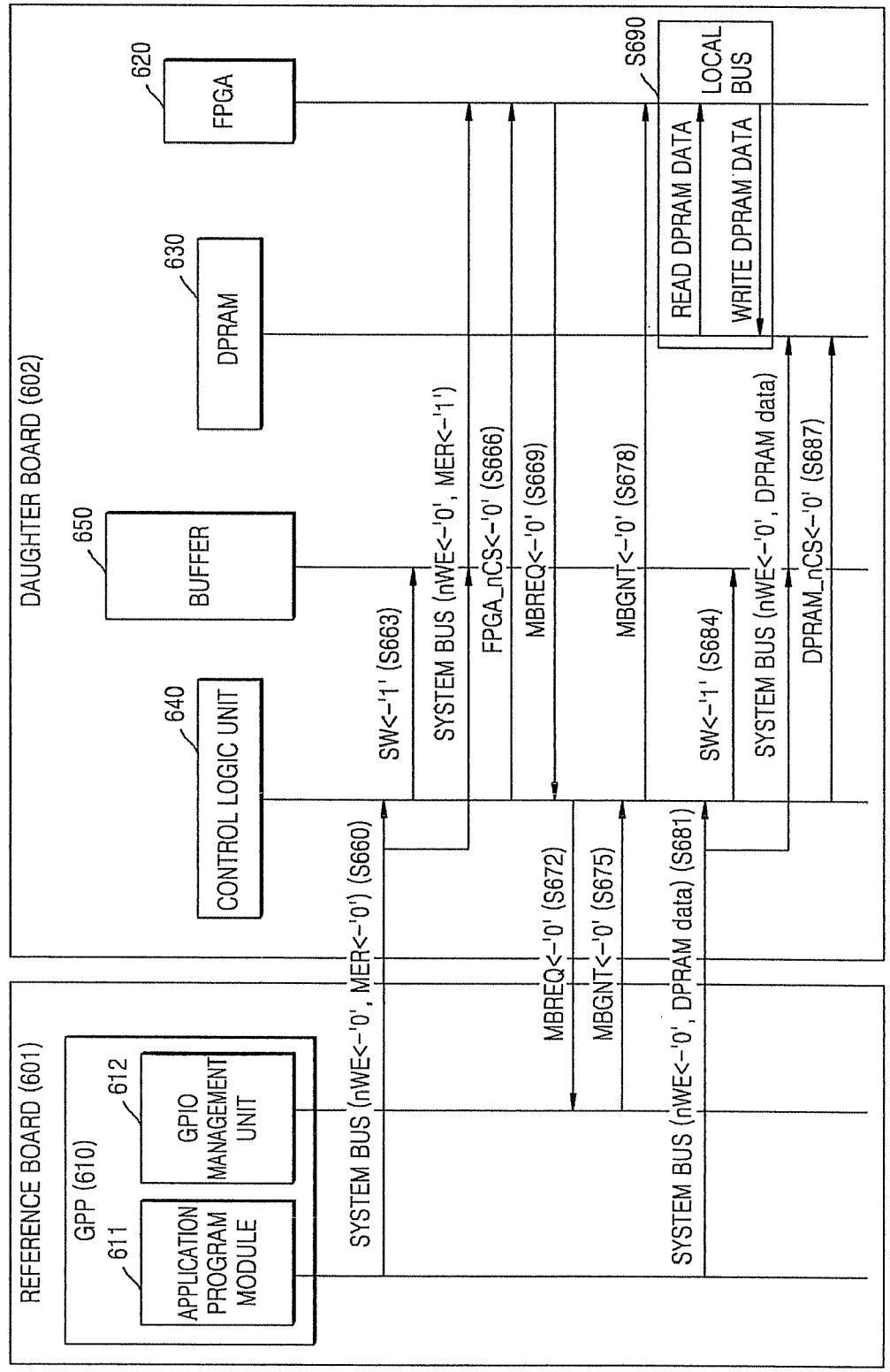
FIG. 6 is a diagram showing a process of occupying a memory by a general-purpose processor (GPP) of the shared memory control apparatus of FIG. 2.

FIG. 6 is a diagram showing a process of occupying a memory by the GPP 210 of the shared memory control apparatus of FIG. 2.

Referring to FIG. 6, an application program module 611 of a GPP 610 may transmit data and an instruction to write a value '0' in an MER of an FPGA 620 through a system bus, in operation S660. In the present embodiment, the value '0' written in the MER means that the GPP 610 intends to be a master of the system bus and access a DPRAM 630.

In operation 663, a control logic unit 640 may receive the instruction through a first system bus and transmit a value '1' to a switch SW, and instruct the switch SW to establish a connection between the first and second system buses so that the instruction and data may be transmitted to the FPGA 620 through a second system bus.

In operation S666, the control logic unit 640 may output an FPGA_nCS signal to the FPGA 620 that will receive the instruction and data written in the system bus. For example, the transmission of an FPGA_nCS signal having a value '0' means that the FPGA 620 is selected. Accordingly, the GPP 610 may access the FPGA 620 and write or read data to or from the FPGA 620.

Next, from the value written in the MER, the FPGA 620 may confirm that the GPP 610 needs to occupy the system bus. Thus, the FPGA 620 may transmit a request for non-occupancy of the system bus to the control logic unit 640, in operation S669. For example, in order to transmit the request for the non-occupancy of the system bus, the FPGA 620 may transmit an MBREQ signal having a value '0', which indicates an intention not to occupy the system bus.

In operation S672, the control logic unit 640 may transmit the request for the non-occupancy of the system bus from the FPGA 620 to a GPIO management unit 612 of the GPP 610. In operation S675, since the GPP 610 needs to occupy the system bus, the GPIO management unit 612 may transmit a grant signal to the control logic unit 640 in response to the request. In the present embodiment, the GPIO management unit 612 may transmit an MBGNT signal having a value '0' to grant the request for the non-occupancy of the system bus. Thus, the control logic unit 640 may transmit the grant of the GPP 610 about the request of the FPGA 620 for the non-occupancy of the system bus to the FPGA 620, in operation S678.

In this process, the GPP 610 may obtain the right to access the DPRAM 630. Thus, the application program module 611 of the GPP 610 may write data and an instruction to write data of the DPRAM 630 in the system bus, in operation S681.

The control logic unit 640 may receive the instruction to write the data of the DPRAM 630 from the GPP 610 through the first system bus and transmit a value '1' to the switch SW, and instruct a buffer 650 to establish a connection between the first and second system buses so that the data and instruction to write the data of the DPRAM 630 may be transmitted to the DPRAM 630 through the second system bus, in operation S684.

Also, in operation S687, the control logic unit 610 may output a signal to the DPRAM 630 that will receive the instruction and data written in the system bus. Thus, the data written in the system bus may be transmitted to the DPRAM 630.

In operation S690, when the FPGA 620 sets an arbitrary region of the DPRAM 630 as an exclusive memory region thereof and separately manages the exclusive memory region, the FPGA 620 may access data stored in the exclusive memory region at any time through a local bus independent of the system bus.

Figure 7:
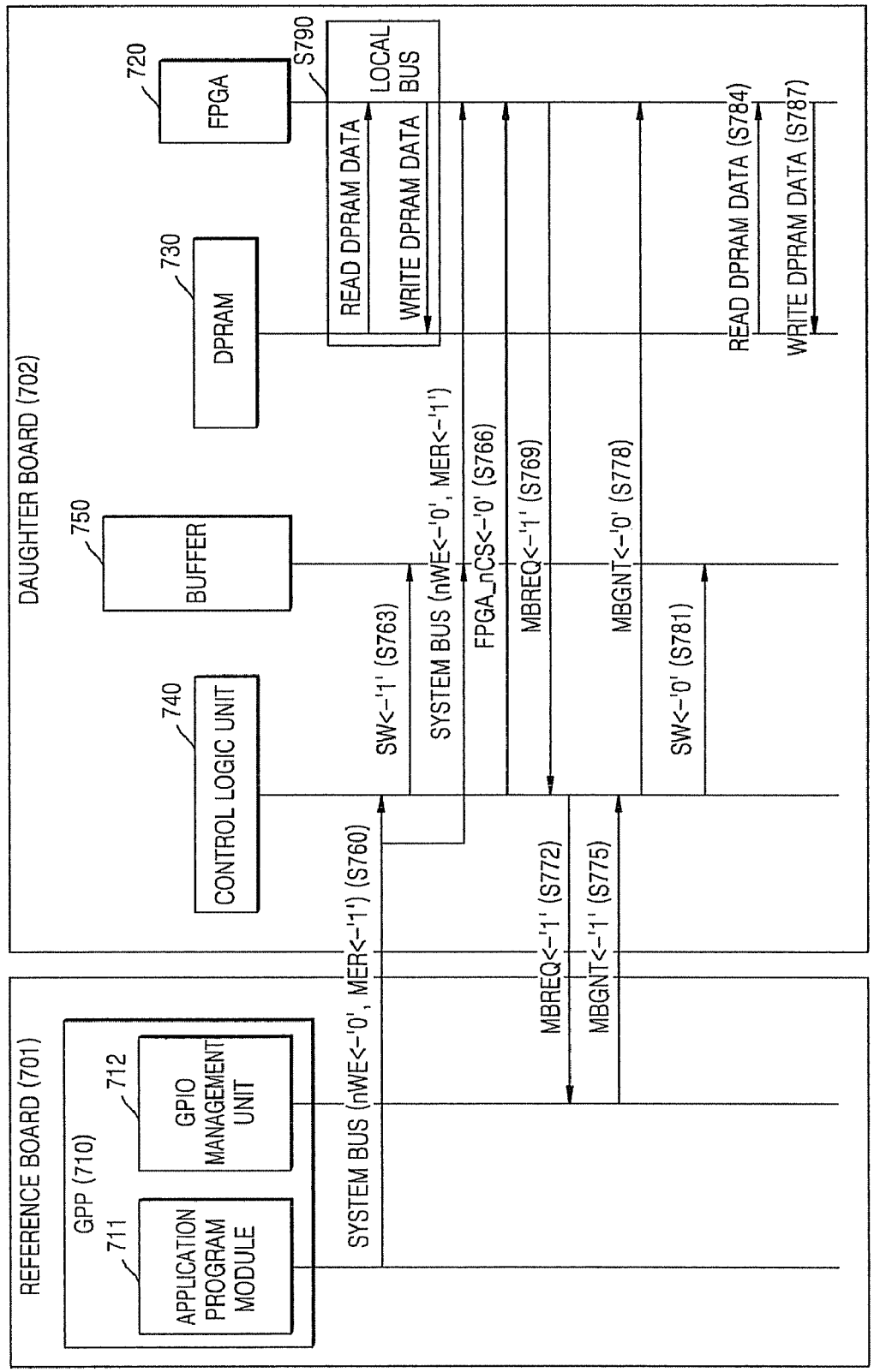
FIG. 7 is a diagram showing a process of occupying a memory by a field-programmable gate array (FPGA) of the shared memory control apparatus of FIG. 2.

FIG. 7 is a diagram showing a process of occupying a memory by the FPGA 220 of the shared memory control apparatus of FIG. 2.

In operation S760, an application program module 711 of a GPP 710 may transmit data and an instruction to write a value '1' in an MER to an FPGA 720 through a system bus in the present embodiment, the value '1' written in the MER means that since the GPP 710 does not need to access a memory, the GPP 710 intends to give the right to access the memory to other devices.

In operation S763, a control logic unit 740 may receive the instruction through a first system bus and transmit a value '1' to a switch SW, and instruct a buffer 750 to establish a connection between the first system bus and a second system bus so that the instruction and data may be transmitted to the FPGA 720 through the second system bus.

In operation S766, the control logic unit 740 may output an FPGA_nCS signal to the FPGA 720 that will receive the instruction and data written in the system bus. For example, the transmission of an FPGA_Ncs signal having a value '0' means that the FPGA 720 is selected. Thus, the GPP 710 may access the FPGA 720 and write or read data to or from the FPGA 720.

Next, from the value stored in the MER, the FPGA 720 may confirm that the GPP 710 does not need to occupy the system bus. Thus, the FPGA 720 may transmit a request for occupancy of the system bus to a control logic unit 740, in operation S769, so that the FPGA 720 may occupy the system bus. In the present embodiment, the FPGA 720 may transmit an MBREQ signal having a value '1', which indicates an intention to occupy the system bus.

In operation S772, the control logic unit 740 may transmit the request for the occupancy of the system bus from the FPGA 720 to a GPIO management unit 712 of the GPP 710. The GPIO management unit 712 may transmit a grant signal to the control logic unit 740 in response to the request for the occupancy of the system bus because the GPP 710 does not need to occupy the system bus. In the present embodiment, the GPIO management unit 712 may transmit an MBGNT signal having a value '1' to grant the request for the occupancy of the system bus. Thus, the grant signal of the GPP 710 about the request for the occupancy of the system bus may be transmitted to the FPGA 720 through the control logic unit 740, in operation S778.

Next, in order to allow the FPGA 720 to occupy the system bus, the control logic unit 740 may transmit a value '1' to a switch SW and instruct the buffer 750 to interrupt a connection between the first and second system buses, in operation S781. That is, the first system bus that leads to the GPP 710 may be locked, while the second system bus that leads to the FPGA 720 may be occupied by the FPGA 720.

As a result, since the GPP 710 hands over the right to access the DPRAM 730 to another device, the FPGA 720 may read data from the DPRAM 730, in operation S784, or read data from the DPRAM 140, in operation S787.

When the FPGA 720 sets an arbitrary region of the DPRAM 730 as an exclusive memory region thereof and separately manages the exclusive memory region, the FPGA 720 may access data of the exclusive memory region at any time through a local bus independent of the system bus, in operation S790.

Figure 8:
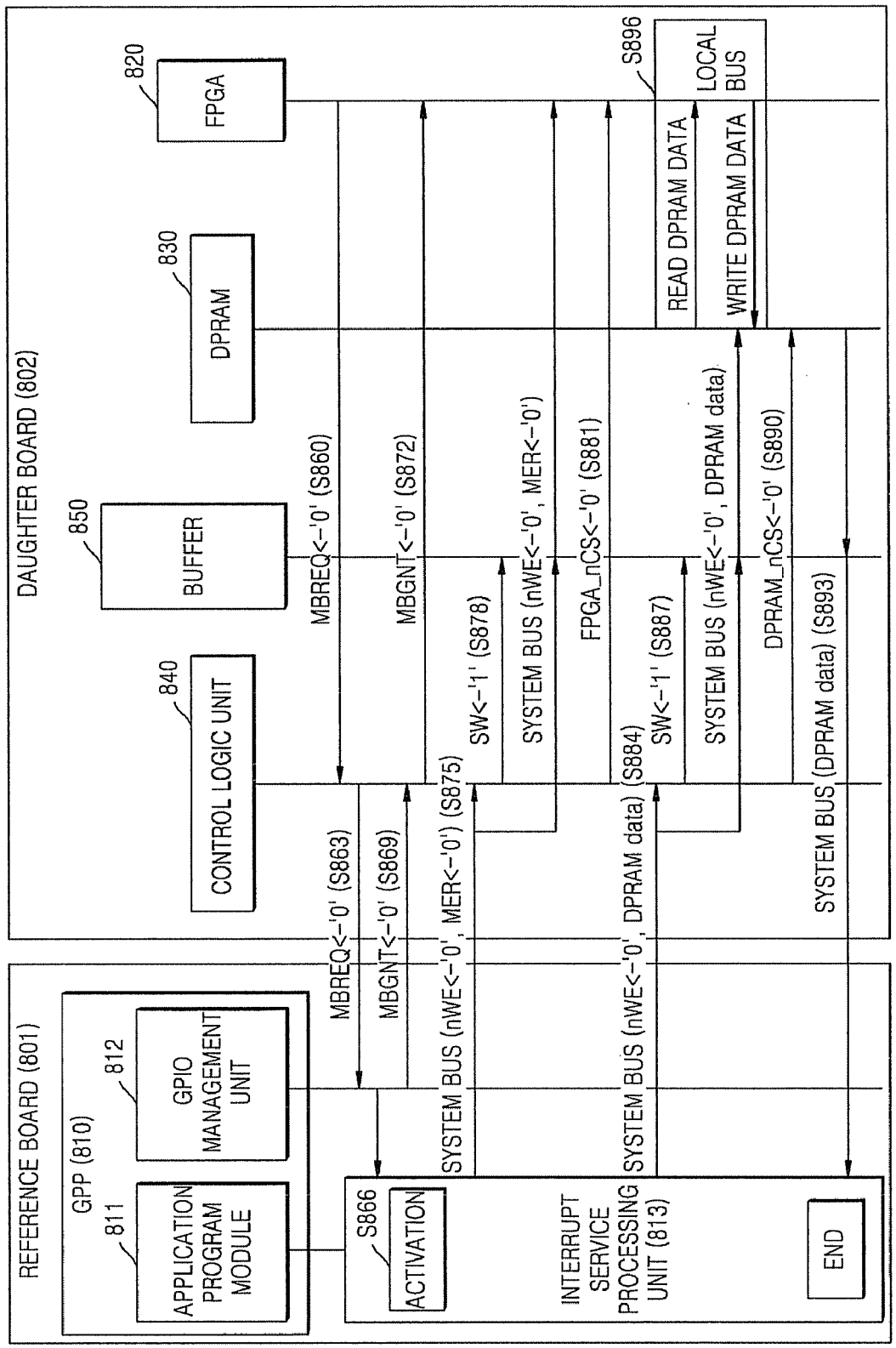
FIG. 8 is a diagram showing a process of transferring the right of occupancy to the GPP by the FPGA of the shared memory control apparatus of FIG. 2.

FIG. 8 is a diagram showing a process of transferring the right of occupancy to the GPP 210 by the FPGA 220 of the shared memory control apparatus of FIG. 2.

To begin with, an FPGA 820 may transmit a request (MBREQ←'0') for non-occupancy of a system bus to a control logic unit 840, in operation S860. The control logic unit 840 transmits the request for the non-occupancy of the system bus to a GPIO management unit 812 of a GPP 810, in operation S863, and an interrupt service processing unit 813 connected to a GPIO port to which an MBREQ signal is input may execute an interrupt service routine, in operation S866. Since the present embodiment is realized to execute the interrupt service routine in a falling edge, the interrupt service routine may be executed at a point in time when the MBREQ signal transits from a value '1' to a value '0'.

Meanwhile, in response to the request (MBREQ←'0') for the non-occupancy of the system bus, the GPIO management unit 812 of the GPP 810 may transmit a grant signal (MBGNT←'0') through the control logic unit 840 (refer to operation S869) to the FPGA 820 (refer to operation S872).

Meanwhile, since the FPGA 820 requested for the non-occupancy of the system bus, the GPP 810 may obtain the right to access the system bus. Thus, an application program module 811 of the GPP 810 may transmit data and an instruction to write a value '0' in an MER to the FPGA 150 through the system bus, in operation S875. Here, the value '0' written in the MER means that the GPP 810 intends to be a master of the system bus and access a DPRAM 830.

In operation S878, the control logic unit 840 may receive the instruction through a first system bus, transmit a value '1' to a switch SW, and instruct a buffer 850 to establish a connection between the first system bus and a second system bus so that the instruction and data may be transmitted to the FPGA 820 through the second system bus.

In operation S881, the control logic unit 840 may output an FPGA_nCS signal to the FPGA 820 that will receive the instruction and data written in the system bus. For example, the transmission of an FPGA_nCS signal having a value '0' means that the FPGA 820 is selected. Thus, the GPP 810 may access the FPGA 820 and write or read data to or from the FPGA 820.

In operation S884, the application program module 811 of the GPP 810 may store an instruction to write data of the DPRAM 830 in the system bus.

In operation S887, the control logic unit 840 may receive the instruction to write the data of the DPRAM 830 from the GPP 810 through the first system bus, transmit a value '1' to the switch SW, and instruct the buffer 850 to establish the connection between the first and second system buses such that the instruction and data may be transmitted through the second system bus to the DPRAM 830.

The control logic unit 840 may output a signal to the DPRAM 830 that will receive the instruction and data stored in the system bus, in operation S890, and store the data in the DPRAM 830, in operation S893.

When the FPGA 820 sets an arbitrary region of the DPRAM 830 as an exclusive memory region thereof and separately manages the exclusive memory region, the FPGA 820 may access data of the exclusive memory region at any time through a local bus independent of the system bus, in operation S896.

According to the present invention as described above, a daughterboard or another device, which includes an FPGA and a DPRAM, may be connected to a board including a GPP so that the GPP and the FPGA may easily transmit and receive a large amount of messages through a shared memory having an abundant memory space.

Furthermore, when the FPGA sets an arbitrary region of the shared memory as an exclusive memory region thereof and separately manages the exclusive memory region, the FPGA may access data of the exclusive memory region at any time through a local bus independent of a system bus. As a result, the GPP has the right to access the shared memory and give priority to other devices, thereby overcoming limitations in a region and time usable by the FPGA.

While this invention has been particularly shown and described with reference to embodiments thereof, it will be understood by those of ordinary skill in the art that various changes in form and details may be made therein without departing from the spirit and scope of the invention as defined by the appended claims.

What is claimed is:

1. A shared memory control apparatus comprising:
    a processing unit configured to process an application program;
    a user program unit configured to execute a program written by a user based on the application program of the processing unit and comprising a register;
    a shared memory unit connected to each of the processing unit and the user program unit through a system bus and configured to store data interchanged between the processing unit and the user program unit; and
    a control unit configured to relay a control signal stored in the register indicating whether the system bus, by which the data is interchanged between the processing unit and the user program unit, is occupied, and control connection of each of the processing unit and the user program unit with the system bus in response to the control signal, wherein the system bus includes:
    a first system bus configured to connect the processing unit and a bi-directional buffer; and
    a second system bus configured to connect the bi-directional buffer, the shared memory unit, and the user program unit with the bi-directional buffer controlling connections between the processing unit, user program unit and the shared memory in response to the control signal.

2. The apparatus of claim 1, wherein the control unit interrupts connection of the processing unit with the first system bus when the control signal is a signal indicating that the processing unit grants occupancy of the system bus to the user program unit,
    and the control unit allows the connection of the processing unit with the first system bus when the control signal is a signal that allows the processing unit to store data to be transmitted to the user program unit in the shared memory unit.

3. The apparatus of claim 1, wherein the shared memory unit includes an exclusive memory region connected to the user program unit by the system bus and an additional local bus, the exclusive memory region being arbitrarily accessible by the user program unit.

4. The apparatus of claim 1, wherein the processing unit is a reference board including a general-purpose processor (GPP).

5. The apparatus of claim 1, wherein the user program unit is embodied by a field-programmable gate array (FPGA).

6. A method of controlling a shared memory by a control unit configured to relay a control signal interchanged between a processing unit configured to process an application program and a user program unit configured to execute a program written by a user based on the application program, the method comprising:
    receiving a signal indicating whether the processing unit needs to occupy a system bus connected to the shared memory;
    writing a value corresponding to the received signal in a register of the user program unit;
    transmitting a request of the user program unit for occupancy or non-occupancy of the system bus to the processing unit via a bi-directional bus wherein the request is required for accessing the memory;
    transmitting a grant of the processing unit about the request for the occupancy or non-occupancy of the system bus to the user program unit via the bi-directional bus with a bi-directional buffer controlling connections between the processing unit, user program unit and the shared memory in response to the control signal; and
    allowing the processing unit or the user program unit to occupy the system bus based on the grant.

7. A method of accessing a shared memory by a processing unit configured to process an application program, the method comprising:
    writing a value, indicating whether the processing unit needs to occupy a system bus connected to the shared memory, in a register of a user program unit configured to execute a program written by a user based on the application program;
    receiving a request for occupancy or non-occupancy of the system bus from the user program unit via a bi-directional bus with a bi-directional buffer controlling connections between the processing unit, user program unit and the shared memory in response to the control signal;
    granting the received request depending on whether the processing unit needs to occupy the system bus; and
    accessing the shared memory through the system bus when the processing unit needs to occupy the system bus.

8. A method of accessing a shared memory by a user program unit configured to execute a program written by a user based on an application program processed by a processing unit, the method comprising:
    reading a value, indicating whether or not the processing unit needs to occupy a system bus connected to the shared memory, from a register of the user program unit;
    transmitting a request for occupancy or non-occupancy of the system bus determined based on the read value via a bi-directional bus with a bi-directional buffer controlling connections between the processing unit, user program unit and the shared memory in response to the control signal;
    receiving a grant from the processing unit about the transmitted request; and
    accessing the shared memory through the system bus based on the received grant.

9. The method of claim 8, wherein the shared memory includes an exclusive memory region connected to the user program unit by a local memory, the exclusive memory region being arbitrarily accessible by the user program unit, the method further comprising accessing the exclusive memory region arbitrarily irrespective of the grant.

* * * * *